3,153,614
4-HYDRAZINO-1,2,3-BENZOTHIADIAZINE-1,1-DIOXIDE COMPOSITIONS AND THERAPY
Jerry E. Robertson and John H. Biel, Milwaukee, Wis., assignors to Colgate-Palmolive Company, a corporation of Delaware
No Drawing. Filed Mar. 16, 1961, Ser. No. 96,110
4 Claims. (Cl. 167—65)

This invention relates to chemical compounds having hypotensive activity.

This application is a continuation-in-part of copending application Serial No. 861,440, filed December 23, 1959, and now abandoned.

According to the present invention it has been discovered that 4-hydrazino-1,2,3-benzothiadiazine-1,1-dioxide as the free base, or as a nontoxic acid addition salt, as well as its hydrazones, have potent hypotensive properties of long duration in animals.

4-hydrazino - 1,2,3 - benzothiadiazine - 1,1-dioxide is a known compound and its preparation is reported by E. Schrader in J. Prakt. Chemie 96, page 180 (1917). However, no salts or hydrazones of this compound are apparently reported.

Acid addition salts of 4-hydrazino-1,2,3-benzothiadiazine-1,1-dioxide can be prepared conveniently by contacting the free base with a mineral or organic acid in a suitable liquid reaction medium. Some of the acids with which the base forms salts are hydrochloric, sulfuric, phosphoric, formic, citric, maleic, methylene sulfonic and fumaric acids. By use of a solvent in which the resulting salt is substantially insoluble, it is possible to recover the resulting salt directly from the reaction mixture by filtration.

4-hydrazino - 1,2,3 - benzothiadiazine-1,1-dioxide, or a nontoxic acid addition salt thereof, can be administered to an animal by any suitable route including the intravenous and oral routes. Although the pure compound, as the base or salt, can be administered alone, particularly orally, it is advisable to first combine it with a suitable pharmaceutical carrier to attain a more satisfactory size to dosage relationship.

Pharmaceutical carriers which are liquid or solid may be used. The preferred liquid carrier is water. Isotonic solutions may be employed as parenteral injectable liquids. For oral use, flavoring materials may be included in the compositions.

Solid pharmaceutical carriers such as starch, sugar, talc and the like may be used to form powders. The powders may be used as such or be tableted or be used to fill capsules. Suitable lubricants like magnesium stearate, binders such as gelatin and disintegrating agents like sodium carbonate in combination with citric acid may be used to form the tablets. Care in the choice of solid carriers and other ingredients should be exercised to avoid reaction of the active agent with the excipients. Mannitol is a particularly good carrier for use in this invention and the commercially available product "Carbopol-934," which is identified in United States Patent No. 2,909,462, issued October 20, 1959, is a highly suitable and stable binder.

Unit-dosage forms such as tablets and capsules may contain any suitable predetermined amount of 4-hydrazino-1,2,3-benzothiadiazine-1,1-dioxide, or salt thereof and can be administered one or more at a time at regular intervals. Such forms should generally contain a minimum concentration of 0.1% by weight of active agent, and particularly 1 to 75 mgm. of active agent. The daily dosage of active agent is about 1 to 200 mg. per day or as prescribed.

A typical tablet can be prepared from a mixture of 89.0 gm. of mannitol, 4.0 gm. of "Carbopol-934," 16.5 gm. of 4-hydrazino-1,2,3-benzothiadiazine-1,1-dioxide hydrochloride, and 2.5 gm. of stearic acid. The mixture is blended by passage through a No. 20 screen and slugged in the usual way on a tablet slugging machine. The slugs are ground through a No. 20 screen and compressed into tablets using a ¼ inch punch and die. This formulation is for 1000 tablets. Each tablet is to contain 16.5 mg. of 4-hydrazino-1,2,3-benzothiadiazine-1,1-dioxide hydrochloride.

The potent hypotensive properties of 4-hydrazino-1,2,3-benzothiadiazine-1,1-dioxide has been demonstrated in rats. Anesthetized rats were administered the compound, as the hydrochloride salt, intravenously and the drop in blood pressure observed, as well as the time at which the blood pressure was returning to the original level. The results are recorded in Table I following:

TABLE I

| Sex | Weight of rat in grams | Dose (mgm./kg.) | Original Blood pressure (mm. Hg) | Percent Drop in blood pressure | Blood pressure at time period following administration of compound (in mins.). |
|---|---|---|---|---|---|
| F | 217 | 1 | 130 | 43 | 250+ B.P. still dropping at 250 min. |
| M | 195 | 2.5 | 110 | 64 | 540+ Rtn. to 45 mm. |
| M | 225 | 2.5 | 100 | 50 | 500+ Rtn. to 85 mm. |
| M | 220 | 2.5 | 75 | 53 | 500+ Rtn. to 60 mm. |
| M | 219 | 5 | 105 | 62 | 550+ Rtn. to 45 mm. |
| M | 192 | 5 | 125 | 52 | 550+ Rtn. to 65 mm. |
| F | 210 | 5 | 115 | 57 | 420+ Rtn. to 55 mm. |
| M | 176 | 10 | 120 | 54 | 610 Rat died in 610 min. |
| F | 206 | 20 | 105 | 38 | 550+ Rtn. to 90 mm. |
| M | 176 | 25 | 105 | 57 | 885+ Rtn. to 80 mm. |

There are also provided by this invention novel hydrazones of 4-hydrozino-1,2,3-benzothiadiazine-1,1-dioxide of the formula

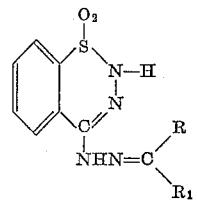

which are also potent hypotensive agents, wherein R and $R_1$ are the same or different substituents such as hydrogen, lower alkyls such as methyl, ethyl, propyl, isopropyl and butyl, a cycloalkyl such as of 5 to 7 carbons including cyclopentyl and cyclohexyl, phenyl, a phenyl-lower alkyl such as benzyl, phenethyl and phenylisopropyl, carboxyl-lower alkyls such as 1-carboxyl-1-methylmethyl, as well as nontoxic salts thereof such as the alkali metal salts including the sodium and potassium salts, and N,N-(disubstituted)amino-lower-alkyls such as N,N-di-(lower alkyl), amino-lower alkyls including dimethylaminomethyl, diethylaminopropyl, N,N-di-(phenyl-lower alkyl) amino-lower alkyls including dibenzylaminomethyl, diphenethylaminoethyl, N,N-(diphenyl amino lower alkyl including diphenylaminomethyl and

represents 3-piperidone, 4-piperidone, 2,2,6,6-tetramethylpiperidone-4 and 2,2,6,6-tetramethylpiperidone-3.

Compounds such as described are produced by reacting 4-hydrozino-1,2,3-benzothiadiazine-1,1-dioxide with an aldehyde or ketone to produce the desired hydrazones. This process can be represented as follows:

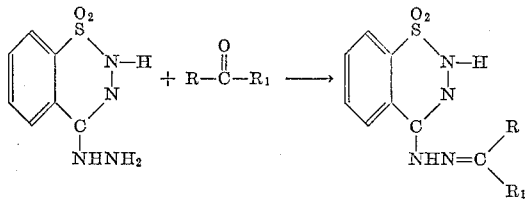

wherein R and $R_1$ have the assigned significance.

Some of the aldehydes and ketones suitable for use in the reaction are formaldehyde, acetaldehyde, propionaldehyde, butyraldehyde, valeraldehyde, dimethylaminoacetal, diethylaminoacetal, 3-dimethylaminopropion aldehyde, di-benzylaminoacetaldehyde, benzaldehyde, phenylacetaldehyde, acetone, methyl ethyl ketone, phenylethyl methyl ketone, phenylbutyl ethyl ketone, p-chlorophenylbutyraldehyde, 3,4 - methylenedioxyphenylvaleraldehyde, o-methylbenzyl methyl ketone, cyclopentanone, cyclohexanone, 3-piperidone, 4-piperidone, 2,2,6,6-tetramethylpiperidone-4, and 2,2,6,6-tetramethylpiperidone-3.

The reaction between the aldehyde or ketone and the hydrazine is conveniently effected by contacting the reactants in the presence of water or a lower alcohol. The reaction proceeds at room temperature although slightly elevated temperatures can be employed to increase the rate of reaction. Recovery of the hydrazone is effected by conventional methods.

Some of the hydrazones produced in this way are:

4 - (methylidenehydrazino)-1,2,3-benzothiadiazine-1,1-dioxide, 4-(ethylidenehydrazino)-1,2,3-benzothiadiazine - 1,1 - dioxide, 4-(cyclohexylidenehydrazino) - 1,2,3 - benzothiadiazine-1,1,-dioxide, 4-(3-butylidenehydrazino) - 1,2,3 - benzothiadiazine-1,1-dioxide, 4-(benzylidenehydrazino) - 1,2,3 - benzothiadiazine-1,1-dioxide, 4-(phenethylidenehydrazino) - 1,2,3 - benzothiadiazine-1,1-dioxide, 4-(dimethylaminomethylidenehydrazino) - 1,2,3 - benzothiadiazine-1,1-dioxide, 2,2,6,6 - tetramethylpiperidone-4-[4-(1,1-dioxo-1,2,3-benzothiadiazinyl)]-hydrazone, Pyruvic acid-[4-(1,1-dioxo-1,2,3 - benzothiadiazyl)]-hydrazone, and Piperidone-4-[4-(1,1-dioxo - 1,2,3 - benzothiadiazinyl)]-hydrazone.

These and other hydrazones of this invention have potent depressor activity and thus are useful in the treatment of hypertension. They also are useful standards in the study of hypertension and thus have pharmacological value. They can be administered and used according to the prior disclosure herein pertaining to 4-hydrazino-1,2,3-benzothiadiazine-1,1-dioxide.

The following examples are presented to illustrated the preparation of 4-hydrazino-1,2,3 - benzothiadiazine-1,1-dioxide and acid addition salts thereof as well as hydrazones thereof.

EXAMPLE 1

*4-Hydrazino-1,2,3-Benzothiadiazine-1,1-Dioxide* o-Cyanobenzenesulfonyl chloride (10 g., 0.059 mole) was dissolved in 100 ml. of dry benzene held in a 300 ml. round bottom flask fitted with a stirrer, condenser, dropping funnel and cooled by an ice bath. To this solution was added 10 g. of anhydrous hydrazine over a period of 1 hour. As the hydrazine was added, a yellow oil separated. Stirring was continued for an additional 0.5 hour at about 5° C. and then for 1 hour at room temperature. The benzene layer was removed by decantation; more benzene (50 ml.) was added, mixed with the oil, allowed to separate, and also decanted off. The oil was subjected to a mild vacuum to remove the last traces of benzene. The addition of about 200 ml. of hot water gave a solution, which on cooling, yielded a yellow precipitate.[1] This material after separation and recrystallization from water gave 5.0 g. (41%) of colorless product, M.P. 146° C.

EXAMPLE 2

*4-Hydrazino-1,2,3-Benzothiadiazine-1,1-Dioxide Hydrochloride*

4-hydrazino-1,2,3-benzothiadiazine-1,1-dioxide (4.5 g., 0.021 mole) was dissolved in 300 ml. of acetonitrile with warming, the solution filtered and ethereal HCl slowly added with stirring until precipitation was completed. The solid was separated by filtration, washed with fresh acetonitrile and dried to give 4.7 g. (90%), M.P. 176–177° C. of product.

*Analysis.*—Calcd. for $C_7H_9N_4O_2S \cdot HCl$: Cl, 14.26. Found: Cl, 14.53.

EXAMPLE 3

*4-(Beta-Isopropylidenehydrazino)-1,2,3-Benzothiadiazine-1,1-Dioxide*

4-hydrazino-1,2,3-benzothiadiazine-1,1-dioxide (5.0 g., 0.025 mole) was treated with a solution of 1.5 ml. of conc. HCl in 200 ml. acetone. After thorough mixing at room temperature the solid which separated was collected and dried to provide 4.7 g. (81%) of product, M.P. 181° C. (detonates).

*Analysis.*—Calcd. for $C_{10}H_{12}N_4S_1O_2$: S, 11.11; N, 19.43. Found: S, 10.98; N, 20.04.

EXAMPLE 4

*Pyruvic Acid-[4-(1,1-Dioxo-1,2,3-Benzothiadiazyl)]-Hydrazone*

4-hydrazino-1,2,3-benzothiadiazine-1,1-dioxide (4.0 g., 0.020 mole) was suspended in 100 ml. of warm methanol and 4.0 g. (0.044 mole) of pyruvic acid was added to give a solution. After refluxing for 15 minutes, filtering, diluting with 100 ml. of hot water, and cooling, a solid separated which afforded 2.4 g., (42%) of product, M.P. 120–125° C.

*Analysis.*—Calcd. for $C_{10}H_{10}N_4O_4S$: S, 11.35; N.E., 282. Found: S, 11.32; N.E., 306.

EXAMPLE 5

*2,2,6,6-Tetramethylpiperidone-4-[4-(1,1-Dioxo-1,2,3-Benzothiadiazinyl)]-Hydrazone Acetate*

4-hydrazino-1,2,3-benzothiadiazine-1,1-dioxide (10.6 g., 0.050 mole) was dissolved in 50 ml. of ethanol and a solution of 7.8 g. (0.050 mole) of 2,2,6,6-tetramethylpiperidone-4 and 4.5 g. (0.075 mole) of glacial acetic acid in 30 ml. of ethanol was added with stirring at room temperature. After stirring overnight, the solid which formed was collected and washed with two small portions of cold ethanol and then with ether to afford, after drying, 19.6 g. (96%) of product, M.P. 196–199° C.

*Analysis.*—Calcd. for $C_{18}H_{27}N_5SO_4$: N, 17.11; S, 7.86. Found: N, 17.24; S, 7.96.

Various changes and modifications of the invention can be made and, to the extent that such variations incorporate the spirit of this invention, they are intended to be included within the scope of the appended claims.

What is claimed is:

1. A pharmaceutical composition in unit dosage form comprising 1 to 75 mg. of a member of the group consisting of 4-hydrazino-1,2,3-benzothiadiazine-1,1-dioxide and nontoxic acid addition salts thereof, and a pharmaceutical carrier.

---

[1] This water crystallization and the subsequent recrystallization should be carried out as quickly as possible.

2. A pharmaceutical tablet comprising 1 to 75 mg. of a member of the group consisting of 4-hydrazino-1,2,3-benzothiadiazine-1,1-dioxide and nontoxic acid addition salts thereof and a pharmaceutical carrier.

3. The method of inducting a hypotensive effect in an animal which comprises administering to an animal a safe but effective amount of a member of the group consisting of 4-hydrazino-1,2,3-benzothiadiazine-1,1-dioxide and nontoxic acid addition salts thereof.

4. The method of inducing a hypotensive effect in an animal which comprises administering 1 to 200 mg. daily of 4-hydrazino-1,2,3-benzothiadiazine-1,1-dioxide hydrochloride to the animal.

References Cited in the file of this patent

UNITED STATES PATENTS

| | | |
|---|---|---|
| 2,762,745 | Benend | Sept. 11, 1956 |
| 2,809,194 | Novello | Oct. 8, 1957 |
| 2,910,475 | Novello | Oct. 27, 1959 |

FOREIGN PATENTS

| | | |
|---|---|---|
| 608,898 | Belgium | Apr. 6, 1962 |

OTHER REFERENCES

Through Chemical Abstracts, vol. 57, p. 12515f, July–December 1962, citing also Swiss applications dated Oct. 6, 1960, and July 22, 1961.

Schrader Chemical Society Journal (London), vol. 114, part 1, pages 197–198 (1918).

Craver et al.: J. Am. Pharm. Assoc., vol. 40, page 559 (1951).

Degering et al.: An Outline of Organic Nitrogen Compounds, pages 385–389 (1950).

Freis: J.A.M.A. 169: 2, pages 105–108, Jan. 10, 1959.

Ford: Southern Med. J., January 1959, vol. 52, pages 40–45.

Nussbaum et al.: Am. J. Med. Sci., December 1958, pages 786–789.

UNITED STATES PATENT OFFICE
CERTIFICATE OF CORRECTION

Patent No. 3,153,614                             October 20, 1964

Jerry E. Robertson et al.

It is hereby certified that error appears in the above numbered patent requiring correction and that the said Letters Patent should read as corrected below.

Column 2, line 36, for "4-hydrozino-1,2,3-" read -- 4-hydrazino-1,2,3- --; line 62, for "N,N-(diphenyl amino" read -- N,N-(diphenyl) amino --; column 3, line 2, for "4-hydrozino-" read -- 4-hydrazino- --; lines 5 to 13, in the right-hand bottom side of the second ring of both formulas reading:

Signed and sealed this 9th day of March 1965.

(SEAL)
Attest:

ERNEST W. SWIDER                             EDWARD J. BRENNER
Attesting Officer                             Commissioner of Patents